United States Patent
Park et al.

(10) Patent No.: US 12,505,834 B2
(45) Date of Patent: Dec. 23, 2025

(54) METHOD FOR CONTROLLING DEVICE USING VOICE RECOGNITION AND DEVICE IMPLEMENTING THE SAME

(71) Applicant: LG Electronics Inc., Seoul (KR)

(72) Inventors: Yun Sik Park, Incheon (KR); Sung Mok Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 17/613,420

(22) PCT Filed: May 24, 2019

(86) PCT No.: PCT/KR2019/006252
§ 371 (c)(1),
(2) Date: Nov. 22, 2021

(87) PCT Pub. No.: WO2020/241906
PCT Pub. Date: Mar. 12, 2020

(65) Prior Publication Data
US 2022/0254344 A1   Aug. 11, 2022

(51) Int. Cl.
G10L 15/16 (2006.01)
G10L 15/22 (2006.01)
G10L 15/30 (2013.01)
G10L 15/32 (2013.01)
G10L 17/22 (2013.01)

(52) U.S. Cl.
CPC .............. *G10L 15/22* (2013.01); *G10L 15/30* (2013.01); *G10L 15/32* (2013.01); *G10L 17/22* (2013.01); *G10L 2015/223* (2013.01)

(58) Field of Classification Search
None
See application file for complete search history.

(56) References Cited

U.S. PATENT DOCUMENTS

| 4,795,089 | A | * | 1/1989 | Tezuka | F24F 11/86 236/94 |
| 8,957,847 | B1 | * | 2/2015 | Karakotsios | G06V 40/18 345/207 |
| 10,412,556 | B1 | * | 9/2019 | Givol | H04W 4/025 |
| 10,610,146 | B1 | * | 4/2020 | Kahn | H04W 4/40 |

(Continued)

FOREIGN PATENT DOCUMENTS

| EP | 3382949 | 10/2018 |
| JP | 2001145180 | 5/2001 |

(Continued)

OTHER PUBLICATIONS

Office Action in Japanese Appln. No. 2021-569147, dated Jan. 10, 2023, 8 pages (with English translation).

(Continued)

*Primary Examiner* — Jakieda R Jackson
(74) *Attorney, Agent, or Firm* — Fish & Richardson P.C.

(57) ABSTRACT

The present disclosure relates to a method for controlling a device by using voice recognition, and a device implementing the same, and a device for controlling another device by using voice recognition in one embodiment includes a controller which analyzes a voice instruction input to a voice input unit, identifies a second voice recognition device which is to perform the instruction, and generates a control message to be transmitted to the second voice recognition device.

10 Claims, 7 Drawing Sheets

(56) References Cited

U.S. PATENT DOCUMENTS

| | | | |
|---|---|---|---|
| 11,086,582 B1* | 8/2021 | Lizarazo Patino | G06F 3/0416 |
| 11,435,888 B1* | 9/2022 | Gleeson | G06F 1/1698 |
| 2004/0204830 A1* | 10/2004 | Esaki | G01C 21/30 |
| | | | 340/995.16 |
| 2005/0197752 A1* | 9/2005 | Yang | G05D 1/0261 |
| | | | 701/23 |
| 2008/0182518 A1* | 7/2008 | Lo | H04N 21/43632 |
| | | | 455/41.3 |
| 2010/0293502 A1* | 11/2010 | Kang | G06F 1/1626 |
| | | | 715/810 |
| 2011/0218812 A1* | 9/2011 | Patel | G06Q 30/04 |
| | | | 704/277 |
| 2012/0086568 A1* | 4/2012 | Scott | G05B 15/02 |
| | | | 340/501 |
| 2012/0221187 A1* | 8/2012 | Jeon | B25J 9/1676 |
| | | | 701/25 |
| 2013/0109292 A1* | 5/2013 | Yamashita | F24F 7/08 |
| | | | 454/249 |
| 2014/0020860 A1* | 1/2014 | Matsumoto | F24F 1/0057 |
| | | | 165/11.1 |
| 2014/0316636 A1* | 10/2014 | Hong | G01C 21/206 |
| | | | 901/1 |
| 2015/0029880 A1 | 1/2015 | Burns et al. | |
| 2015/0194152 A1 | 7/2015 | Katuri et al. | |
| 2015/0250372 A1* | 9/2015 | T P | A47L 11/4011 |
| | | | 701/28 |
| 2015/0279356 A1* | 10/2015 | Lee | G10L 15/20 |
| | | | 704/251 |
| 2016/0004085 A1* | 1/2016 | Stroetmann | G02B 27/0176 |
| | | | 345/8 |
| 2016/0077794 A1* | 3/2016 | Kim | G10L 15/20 |
| | | | 704/275 |
| 2016/0154089 A1* | 6/2016 | Altman | G08B 29/26 |
| | | | 367/124 |
| 2016/0154996 A1* | 6/2016 | Shin | G06V 40/28 |
| | | | 901/1 |
| 2016/0155443 A1* | 6/2016 | Khan | G06F 3/167 |
| | | | 704/275 |
| 2016/0241976 A1* | 8/2016 | Pearson | G11B 27/11 |
| 2016/0250370 A1* | 9/2016 | Orito | A61L 9/014 |
| | | | 422/122 |
| 2016/0295384 A1* | 10/2016 | Shan | H04W 4/08 |
| 2017/0045866 A1* | 2/2017 | Hou | H04W 12/06 |
| 2017/0053650 A1* | 2/2017 | Ogawa | G10L 25/51 |
| 2017/0090864 A1* | 3/2017 | Jorgovanovic | H04M 11/007 |
| 2017/0133011 A1* | 5/2017 | Chen | H04L 12/2832 |
| 2017/0242655 A1 | 8/2017 | Jarvis et al. | |
| 2017/0325647 A1* | 11/2017 | Kwak | A47L 9/2852 |
| 2017/0357478 A1 | 12/2017 | Piersol et al. | |
| 2018/0021942 A1* | 1/2018 | Hummel | A47L 9/2873 |
| | | | 700/253 |
| 2018/0052216 A1* | 2/2018 | Vered | G01S 5/0072 |
| 2018/0096683 A1* | 4/2018 | James | G10L 15/22 |
| 2018/0113467 A1* | 4/2018 | Kim | A47L 9/009 |
| 2018/0213364 A1* | 7/2018 | Segal | H04L 51/222 |
| 2018/0300103 A1 | 10/2018 | Bjorkengren | |
| 2018/0306456 A1* | 10/2018 | Subban | F24F 3/0442 |
| 2018/0308490 A1* | 10/2018 | Lim | G10L 15/18 |
| 2018/0336905 A1* | 11/2018 | Kim | G10L 17/22 |
| 2018/0358009 A1* | 12/2018 | Daley | G06F 3/167 |
| 2018/0360285 A1* | 12/2018 | Erkek | H04W 4/80 |
| 2019/0044745 A1* | 2/2019 | Knudson | H04W 4/029 |
| 2019/0074008 A1* | 3/2019 | Beckhardt | G10L 15/22 |
| 2019/0104119 A1* | 4/2019 | Giorgi | H04L 63/102 |
| 2019/0128553 A1* | 5/2019 | Hilbig | F24F 3/163 |
| 2019/0234632 A1* | 8/2019 | Reeder | F24F 11/0001 |
| 2020/0020165 A1* | 1/2020 | Tran | G06F 3/011 |
| 2020/0072937 A1 | 3/2020 | Baek et al. | |
| 2020/0184964 A1* | 6/2020 | Myers | G06F 3/167 |
| 2021/0333800 A1* | 10/2021 | Chiappetta | G01C 21/206 |

FOREIGN PATENT DOCUMENTS

| | | |
|---|---|---|
| JP | 2003330483 | 11/2003 |
| JP | 2018194810 | 12/2018 |
| JP | 6511590 | 5/2019 |
| KR | 20150043058 | 4/2015 |
| KR | 10-2018-0119070 A | 11/2018 |
| KR | 10-20180125241 A | 11/2018 |
| KR | 10-20180126946 A | 11/2018 |
| KR | 10-20180134628 A | 12/2018 |
| KR | 10-2019-0042931 A | 4/2019 |
| KR | 101972545 | 4/2019 |
| WO | WO2018137872 | 8/2018 |

OTHER PUBLICATIONS

Partial Supplementary European Search Report in European Appln No. 19930394.2, dated Dec. 22, 2022, 19 pages.

Office Action in Korean Appln. No. 10-2021-7028549, mailed on Jul. 18, 2024, 20 pages (with English translation).

Notice of Allowance in Korean Appln. No. 1020217028549, mailed on Feb. 25, 2025, 9 pages (with English translation).

* cited by examiner

METHOD FOR CONTROLLING DEVICE USING VOICE RECOGNITION AND DEVICE IMPLEMENTING THE SAME

CROSS-REFERENCE TO RELATED APPLICATIONS

This application is a National Stage application under 35 U.S.C. § 371 of International Application No. PCT/KR2019/006252, filed on May 24, 2019. The disclosure of the prior application is incorporated by reference in its entirety.

TECHNICAL FIELD

Disclosed herein is a method for controlling a device, based on voice recognition of a plurality of devices and a position of a user, and a device implementing the same.

BACKGROUND ART

In recent years, a variety of voice-based control technologies have been suggested as a means to control home products, home appliances and the like. In particular, when it comes to control over a device such as a home product or a home appliance and the like, a microphone is installed in various ways or research has been performed to develop a module for processing voice recognition processing, to enhance a voice recognition rate.

Voice recognition is performed in circumstances where various types of variables can be happen, so, a device needs to operate in response to the variables to improve accuracy of voice recognition. The present disclosure suggests a method for controlling a device based on a position in which a user utters an instruction as a result of confirmation of the position and cooperation among a plurality of home appliances disposed in a space.

DESCRIPTION OF INVENTION

Technical Problem

To achieve the above objectives, the present disclosure suggests a device that determines position information of a user, based on an input voice, in a state where a plurality of voice recognition devices is disposed, and a method for implementing the same.

The present disclosure suggests a method for controlling devices as a result of calculation of a position of a user, when the user utters an instruction.

The present disclosure suggests a method by which a robot cleaner provides map information to accurately ascertain a position of a user.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solution

A device, which controls another device using voice recognition in one embodiment, may include a controller that analyzes a voice instruction input to a voice input unit, identifies a second voice recognition device that is to execute the instruction, and generates a control message to be transmitted to the second voice recognition device.

The device may insert position information of a first voice recognition device in the control message.

The device may insert a voice file input to the voice input unit in the control message.

The device may further include an instruction database in which instructions corresponding to functions of a plurality of voice recognition devices are stored.

A device, which operates using voice recognition in one embodiment, may include a communicator that receives a control message from the first voice recognition device, and a controller that controls a function provider according to the control message.

When the device is an air purifier or an air conditioner, a controller of the device may determine that a user is around the first voice recognition device, and control the function provider to provide a function indicated by the control message.

In a first voice recognition device and a third voice recognition device that receive a voice, and a second voice recognition device that provides a function corresponding to the input voice instruction, a method for controlling a device using voice recognition in one embodiment may include transmitting a first control message corresponding to a voice instruction input to a voice input unit of the first voice recognition device by the first voice recognition device, transmitting a second control message corresponding to a voice instruction input to a voice input unit of the third voice recognition device by the third voice recognition device, receiving the first control message and the second control message by a communicator of the second voice recognition device, and providing functions indicated by the first control message and the second control message based on position information of the first voice recognition device and the second voice recognition device by a controller of the second voice recognition device.

Advantageous Effect

In the embodiments, a plurality of voice recognition devices disposed may ascertain position information of a user, based on an input voice.

In the embodiments, when an instruction is uttered, a position of a user may be calculated to operate each of the devices.

In the embodiments, a robot cleaner may provide map information to accurately ascertain a position of a user.

Effects are not limited to the effects mentioned above, and one having ordinary skill in the art can readily draw various effects from the configurations in the disclosure.

DETAILED DESCRIPTION OF EXEMPLARY EMBODIMENT

Hereinafter, embodiments in the disclosure are described in detail with reference to the accompanying drawings such that the embodiments can be easily implemented by those skilled in the art. The subject matter of the disclosure can be implemented in various different forms and is not limited to the embodiments set forth herein.

For clarity in description, details which are not associated with the description are omitted, and throughout the disclosure, the same or similar components are referred to by the same reference signs. Some embodiments in the disclosure are described in detail with reference to the accompanying drawings. In the drawings, the same components are referred to by the same reference numeral as possible. In the disclosure, detailed descriptions of known technologies in relation to the disclosure are omitted if they are deemed to make the gist of the disclosure unnecessarily vague.

Terms such as first, second, A, B, (a), (b), and the like can be used to describe components of the disclosure. These terms are used only to distinguish one component from another component, and the essence, order, sequence, number, or the like of the components is not limited by the terms. When a component is "connected", "coupled" or "connected" to another component, the component can be directly coupled or connected to another component, or still another component can be "interposed" therebetween or the components can be "connected", "coupled" or "connected" to each other with still another component interposed therebetween.

In implementing the subject matter of the disclosure, components can be segmented and described for convenience of description. However, these components can be implemented in one device or module, or one component can be divided and implemented into two or more devices or modules.

In the present disclosure, home appliances, household devices and the like, disposed in a specific space and configured to perform a predetermined function, can be collectively referred to as devices. Among the devices, devices performing voice recognition are referred to as voice recognition devices. Additionally, two or more devices disposed in a specific space can receive and transmit a control message, using a communication function.

In the disclosure, a user can operate the devices by giving an instruction set in the devices using a voice. Instructions used to instruct operation of a device can be classified in various ways, based on the sorts of devices. In one embodiment, an instruction can be used to instruct control of the on/off of the devices or performance of a specific function provided by the devices. Instructions can vary depending on the sort of devices.

Additionally, the instructions can be classified into an activation instruction and a control instruction. The control instruction is an instruction for controlling operation of a device. The control instruction is an instruction for controlling a function of each device and includes "Turn on", "Turn off", "Light wind" and the like.

The activation instruction makes a device ready to receive a control instruction. In one embodiment, the activation instruction can include a category name ("TV", "radio" and "refrigerator") of a device or a brand ("Whisen" and "Tromm") of a device, or an interjection or a word in a conversation ("Hey!" and "Look here!").

A plurality of devices can be disposed in a space where a user stays. In the present disclosure, a mic array can be included in a plurality of voice recognition devices. When the user utters an instruction, among the plurality of voice recognition devices, a short-range device can be activated as a result of ascertainment of a position of the user and can use position information of the user and the device to control a home appliance.

Figure 1:
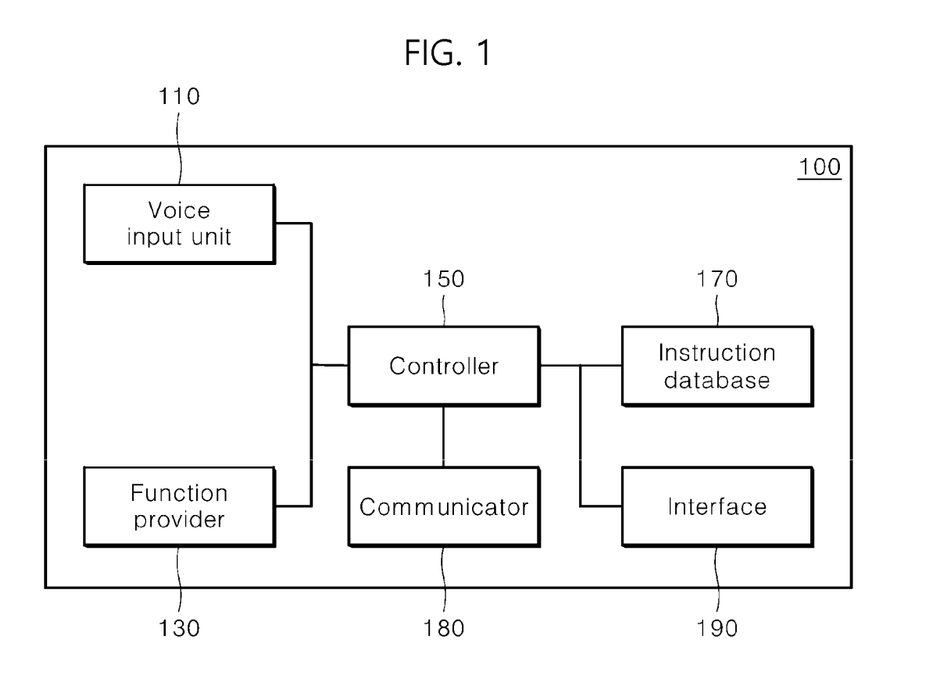
FIG. 1 shows components of a voice recognition device in one embodiment.

FIG. 1 shows components of a voice recognition device in one embodiment. The voice recognition device may receive an instruction uttered by a user to directly operate, or ascertain a target device included in an instruction and instruct the target device to operate.

A voice input unit 110 may receive a voice. A function provider 130 may provide predetermined functions. For example, in case the voice recognition device is a refrigerator, the function provider 130 may provide a refrigerating function/freezing function of a refrigerating compartment and a freezing compartment. In case the voice recognition device is an air conditioner, the function provider 130 may provide functions of discharging air and determining an amount and a direction of discharged air. In case the voice recognition device is an air purifier, the function provider 130 may provide functions of suctioning air and purifying the suctioned air.

A communicator 180 may communicate with another device or an external cloud server. The cloud server may provide position information of devices, or convert an input voice instruction into a text. When a controller 150 does not provide an additional function of recognizing a voice, the cloud server may provide a function of recognizing a voice of an input voice instruction.

In an embodiment in which a first voice recognition device receives a voice instruction and transmits the input voice instruction to a second voice recognition device, a controller 150 of the first voice recognition device may analyzes the voice instruction input to the voice input unit 110 and identify the second voice recognition device that is to execute the instruction. Additionally, the controller 150 of the first voice recognition device may generate a control message to be transmitted to the second voice recognition device.

A communicator 180 of the first voice recognition device may transmit the control message to the second voice recognition device or a plurality of devices including the second voice recognition device. When the communicator 180 transmits the control message to the plurality of devices, broadcasting transmission may be used.

In the embodiment in which a first voice recognition device receives a voice instruction and transmits the input voice instruction to a second voice recognition device, a communicator 180 of the second voice recognition device may receive a control message from the first voice recognition device. Then a controller 150 of the second voice recognition device may control the function provider 130 according to the control message.

The control message may include position information of the first voice recognition device. Alternatively, the control message may include relative position information of the first voice recognition device generated with respect to the position information of the second voice recognition device.

Accordingly, the controller 150 of the first voice recognition device may insert the position information (or the above relative position information) of the first voice recognition device in the control message. That is, the control message may be generated to include position information. The controller 150 of the second voice recognition device may extract the position information (or the above relative position information) of the first voice recognition device from the received control message.

Even if the controller 150 of the first voice recognition device does not additionally put the position information (or the above relative position information) of the first voice recognition device in the control message, the controller 150 of the second voice recognition device may receive the position information of the first voice recognition device or map information including the position information from a cloud server or an external device.

An instruction database 170 may store instructions corresponding to functions of the plurality of voice recognition devices. The instruction database may store instructions corresponding to functions of other devices in addition to the instructions corresponding to the functions of the voice recognition devices. In this case, the voice recognition devices may ascertain which device is a target of the input instruction.

That is, the controller 150 of the first voice recognition device may extract identification information and control information of the second voice recognition device from the input voice instruction, using the instruction database 170, and generate a control message.

In FIG. 1, the voice recognition device may provide a function corresponding to an input instruction when the instruction is an instruction to the device itself. In this case, a position of the user having uttered the instruction may be ascertained through the voice recognition device or another device.

In another example, the voice recognition device may transmit an instruction to a device that is to execute the instruction when the input instruction is an instruction to another device rather than the device.

An interface 190 may output information such as sounds, characters, graphics and the like to the outside or receive a control signal from an external remote controller.

Hereunder, a process of operating the voice recognition device is described.

Figure 2:
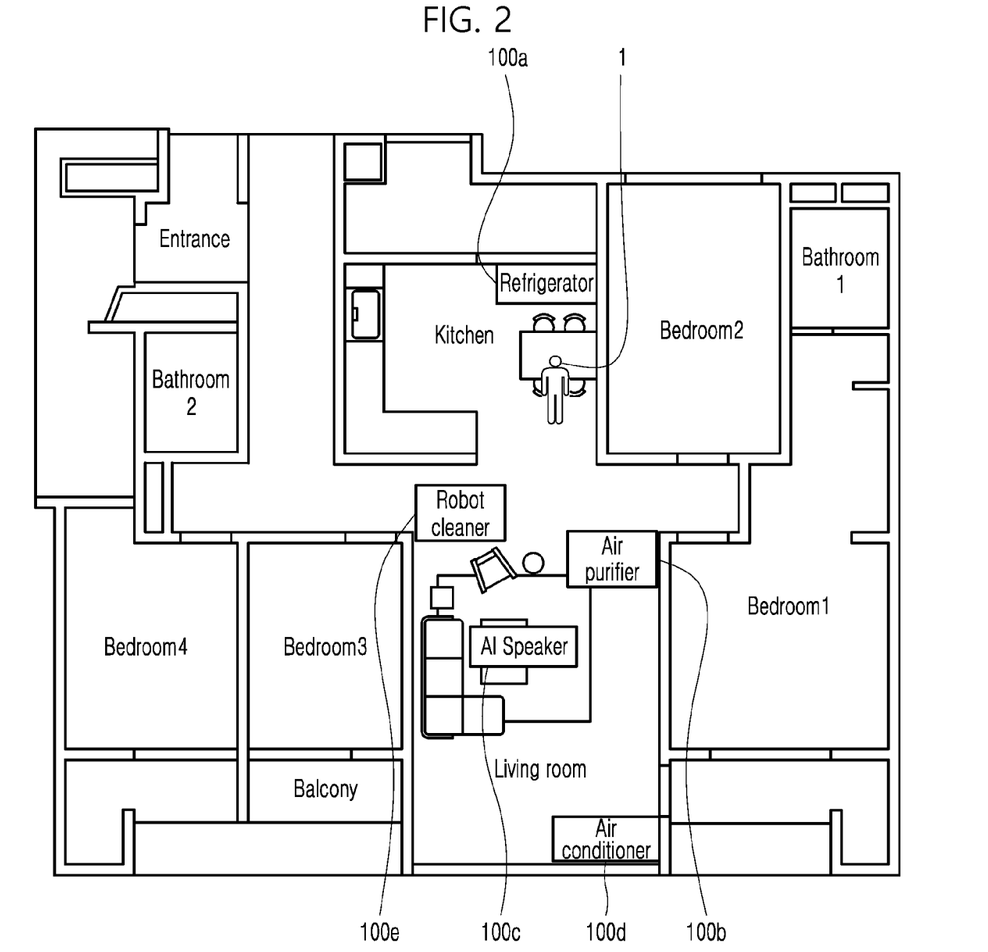
FIG. 2 shows disposition of the voice recognition devices in one embodiment.

FIG. 2 shows disposition of the voice recognition devices in one embodiment. A space is divided by walls and doors, and a refrigerator 100a is disposed in the kitchen. An air purifier 100b, an AI speaker 100c, an air conditioner 100d and a robot cleaner 100e are disposed in the living room. The user (i.e., a speaker) 1 is standing around the refrigerator. All the devices 100a-100e belong to a voice recognition device that performs a function of recognizing a voice.

In FIG. 2, the speaker 1 may input an instruction of "Hi, LG. Turn on the air conditioner." The instruction is divided into an activation instruction "Hi, LG." and a control instruction "Turn on the air conditioner".

The speaker 1's instruction may be input to a voice input unit 110 of the refrigerator 100a. The refrigerator 100a may receive the instruction as a voice, analyze the input instruction and perform voice recognition. The refrigerator 100a may confirm that the speaker 1 has instructed operation of the air conditioner.

Then the refrigerator 100a may transmit a control message, indicating that operation of the air conditioner is instructed, to the air conditioner 100d or one or more of the other voice recognition devices 100b, 100c, 100e. In this case, the control message includes information indicating that the speaker 1 is around the refrigerator 100a.

The refrigerator 100a may transmit the control message directly to the air conditioner 100d. Alternatively, the refrigerator 100a may transmit the control message based on broadcasting transmission, and all the voice recognition devices in the space may receive the control message.

Alternatively, the refrigerator 100a may transmit the input instruction to the AI speaker 100c.

The air conditioner 100d may store a position of the refrigerator in advance, and receive the position of the refrigerator through the AI speaker 100c or the robot cleaner 100e. For example, during a process in which the robot cleaner 100e cleans the space while moving in the space, the robot cleaner may store each home appliance or disposition thereof in the space.

While the robot cleaner 100e learns about the space, the robot cleaner may generate a map to which positions of the devices (the refrigerator, the air purifier, the air conditioner and the like) are applied. Additionally, the position of the refrigerator may be stored in the map.

For example, when the user may have put the robot cleaner around the refrigerator 100a with inputting an instruction "Clean an area around the refrigerator" to the robot in the past. Alternatively, a specific point may be set as the refrigerator 100a in the map, generated by the robot cleaner, by the user or from the outside.

That is, when the robot cleaner 100e obtains information on a space, based on previously-input position information of objects in the space, the robot cleaner 100e may have a position of the refrigerator 100a and a position of the air conditioner 100d.

Accordingly, the robot cleaner 100e may provide relative position information of the refrigerator 100a to the air conditioner 100d based on the position information of the refrigerator 100a or the position information of the air conditioner 100d.

The air conditioner 100d may ascertain position information of the user using the position information of the refrigerator 100a, and control an amount and a direction of air to blow the air toward the user.

Figure 3:
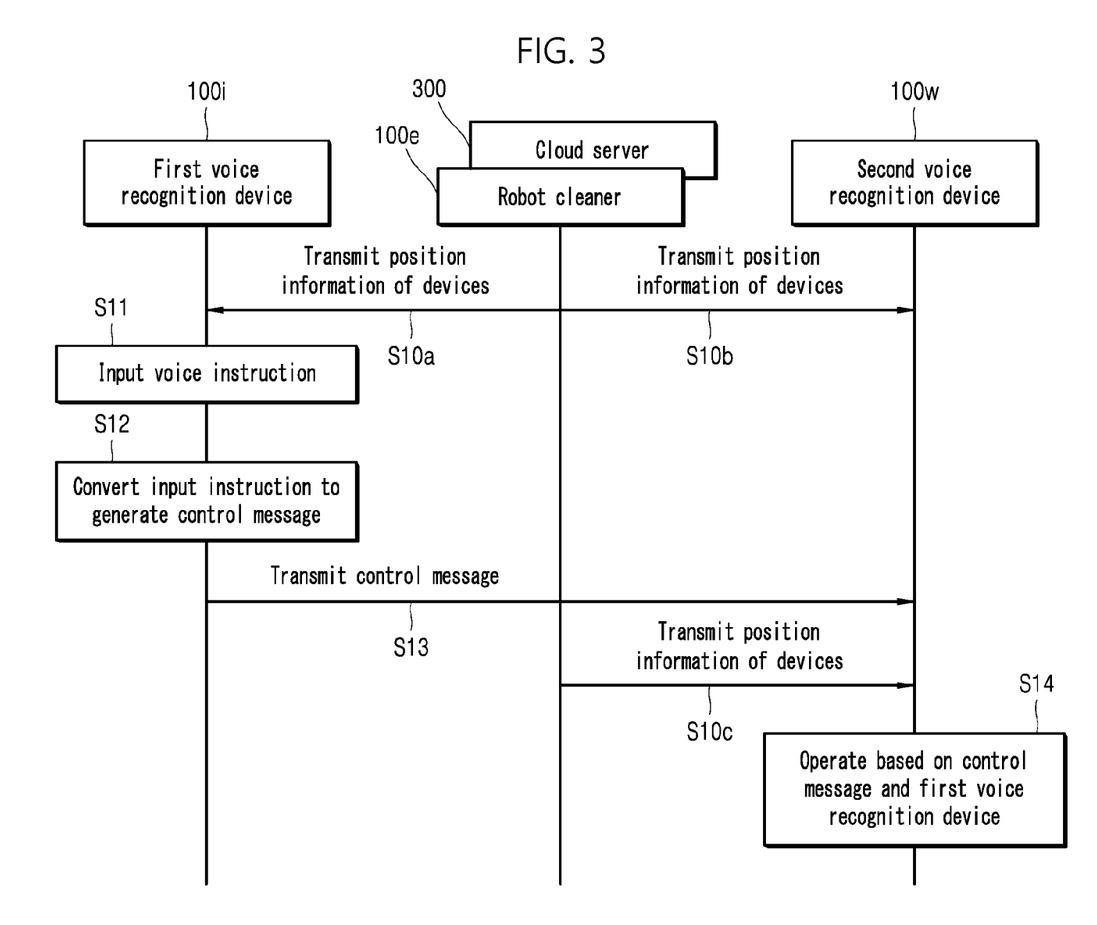
FIG. 3 shows a process of controlling devices, based on a position of a user, using position information possessed by a robot cleaner in one embodiment.

FIG. 3 shows a process of controlling devices, based on a position of a user, using position information possessed by a robot cleaner in one embodiment. As in the embodiment of FIG. 2, the embodiment of FIG. 3 includes a first voice recognition device 100i such as a refrigerator 100a that receives a voice, a robot cleaner 100e, and a second voice recognition device 100w such as an air conditioner 100d that executes an instruction input as a voice.

The first voice recognition device 100i may receive a voice instruction to control the second voice recognition device 100w from the speaker 1 (S11). Then the first voice recognition device 100i may convert the input instruction to generate a control message (S12). The first voice recognition device 100i may transmit the control message to other devices (S13). In this case, the control message may be transmitted using the broadcasting method or transmitted to the second voice recognition device 100w on a one-to-one basis.

The first voice recognition device 100i or the second voice recognition device 100w may receive position information of the first voice recognition device 100i previously from the robot cleaner 100e (S10a & S10b). In this case, the control message may include the position information of the first voice recognition device 100i.

Alternatively, when the transmission in step 13 is broadcasting transmission, the robot cleaner 100e may ascertain the transmission state in step 13, and deliver the position of the first voice recognition device 100i to the second voice recognition device 100*w* (S10*c*). Alternatively, a cloud server 300 may transmit position information of each of the voice recognition devices to the voice recognition devices.

The second voice recognition device 100*w* may operate based on the control message and the first voice recognition device (S14). For example, when a control message which is generated from an instruction "Turn on the air conditioner" is delivered from the first voice recognition device 100*i*, the second voice recognition device 100*w* may blow air toward the first voice recognition device 100*i*.

In FIG. 3, in addition to the robot cleaner 100*e*, the cloud server 300 may store the position information of each of the voice recognition devices, and provide the position information to the voice recognition devices. In this case, the cloud server 300 may provide the position of the other voice recognition devices as relative position based on each voice recognition device. Alternatively, the cloud server 300 may transmit map information including the position information of each of the voice recognition devices, and communicators 180 of the voice recognition devices may receive the map information.

Figure 4:
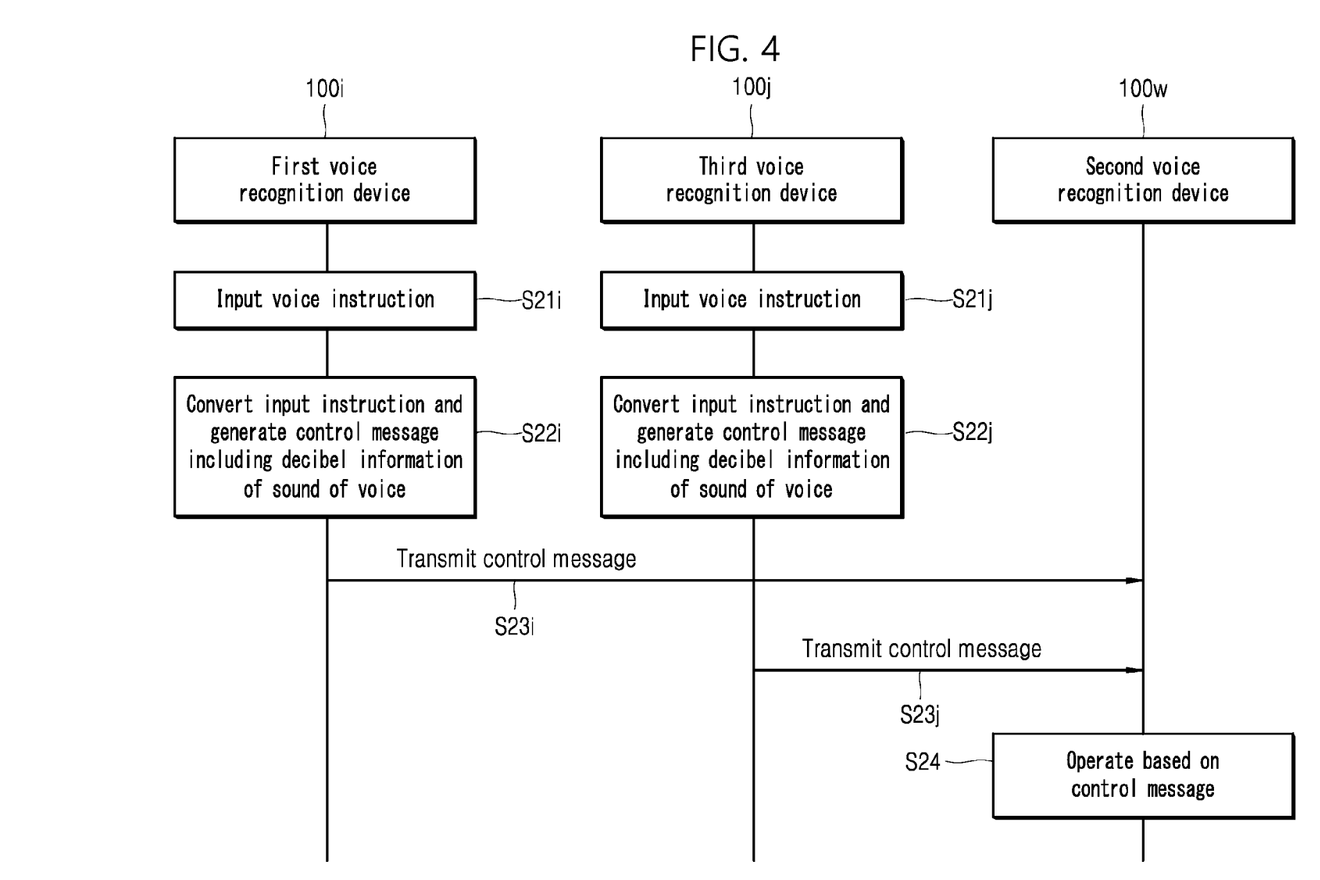
FIG. 4 shows a process in which a plurality of voice recognition devices process a voice instruction input by a speaker in one embodiment.

FIG. 4 shows a process in which a plurality of voice recognition devices process a voice instruction input by a speaker in one embodiment.

When the speaker gives an instruction using a voice in the space of FIG. 2, loudness of a sound of the instruction input to the refrigerator 100*a* closest to the speaker is greater than loudness of the sound of the instruction input to the air purifier 100*b* far from the refrigerator 100*a*.

When two or more voice recognition devices receive a voice, loudness of the input voice may be included in the control message.

In FIG. 4, a first voice recognition device 100*i* and a third voice recognition device 100*j* may receive a voice instruction (S21*i* & S21*j*). Each of the devices may convert the voice instruction to generate a control message. In this case, each of the devices 100*i*, 100*j* may insert loudness information of the voice input to each of the devices 100*i*, 100*j* in the control message when generating the control message (S22*i* & S22*j*).

Each of the devices 100*i*, 100*j* may transmit the control message to the second voice recognition device 100*w* (S23*i* & S23*j*). The second voice recognition device 100*w* may operate based on the control message and the loudness of the voice included in the control message (S24).

For example, under the assumption that loudness of a sound input to the first voice recognition device 100*i* is 5 and loudness of the sound input to the third voice recognition device 100*j* is 3, a second voice recognition device 100*w* may ascertain that the user speaks around the first voice recognition device 100*i*. Then the second voice recognition device 100*w* may set the first voice recognition device 100*i* as the user's position and perform a predetermined function included in the control message.

The second voice recognition device 100*w* may receive the position information of each of the devices through S10*a*, S10*b*, S10*c* and the like in FIG. 3 and store the position information. Alternatively, the second voice recognition device 100*w* may receive the position information of each of the devices from the AI speaker 100*c* or the cloud server disposed outside and store the position information.

The control message may include the position information of the first and third voice recognition devices. Alternatively, the control message may include relative position information of the first and third voice recognition devices, which is generated with respect to position information of the second voice recognition device. Alternatively, the second voice recognition device 100*w* may receive the position information previously from the robot cleaner 100*e*, as illustrated in FIG. 3.

Additionally, in FIGS. 3 and 4, the control message may include a voice file input to voice input units of the first voice recognition device 100*i* or the third voice recognition device 100*j*. For example, when the user says "Turn on the air conditioner", the first voice recognition device 100*i* or the third voice recognition device 100*j* generates a voice file in which the instruction to turn on the air conditioner is stored, and insert the voice file in the control message.

In FIG. 4, the first voice recognition device 100*i* and the third voice recognition device 100*j* may respectively transmit the control message to the second voice recognition device 100*w*. For example, the first voice recognition device 100*i* may transmit a first control message corresponding to a voice instruction input to the voice input unit 110 of the first voice recognition device 100*i* (S23*i*).

Likewise, the third voice recognition device 100*j* may transmit a second control message corresponding to a voice instruction input to the voice input unit 110 of the third voice recognition device 100*j* (S23*j*).

Then a communicator 180 of the second voice recognition device 100*w* may receive the first control message and the second control message. Then a controller 150 of the second voice recognition device 100*w* may provide a function indicated by the first control message and the second control message, based on the position information of the first voice recognition device 100*i* and the second voice recognition device 100*j* (S24).

The controller 150 of the second voice recognition device 100*w* may extract the position information of the first voice recognition device 100*i* from the first control message, and extract the position information of the third voice recognition device 100*j* from the second control message. The controller may ascertain the user's position more accurately using the two pieces of position information. In particular, as a result of comparison of the loudness information of the voice, included in the control messages, the controller may ascertain the user's position accurately.

For example, in the embodiment of FIG. 2, the refrigerator is the first voice recognition device 100*i*, the air purifier is the third voice recognition device 100*j*, and loudness of a voice input to the two devices is at the same level.

In this case, under the assumption that the air conditioner is the second voice recognition device 100*w*, a controller 150 of the air conditioner may determine that there is the speaker between the air purifier and the refrigerator, and control the function provider 130 to direct air at a point in the middle of the two devices.

Figure 5:
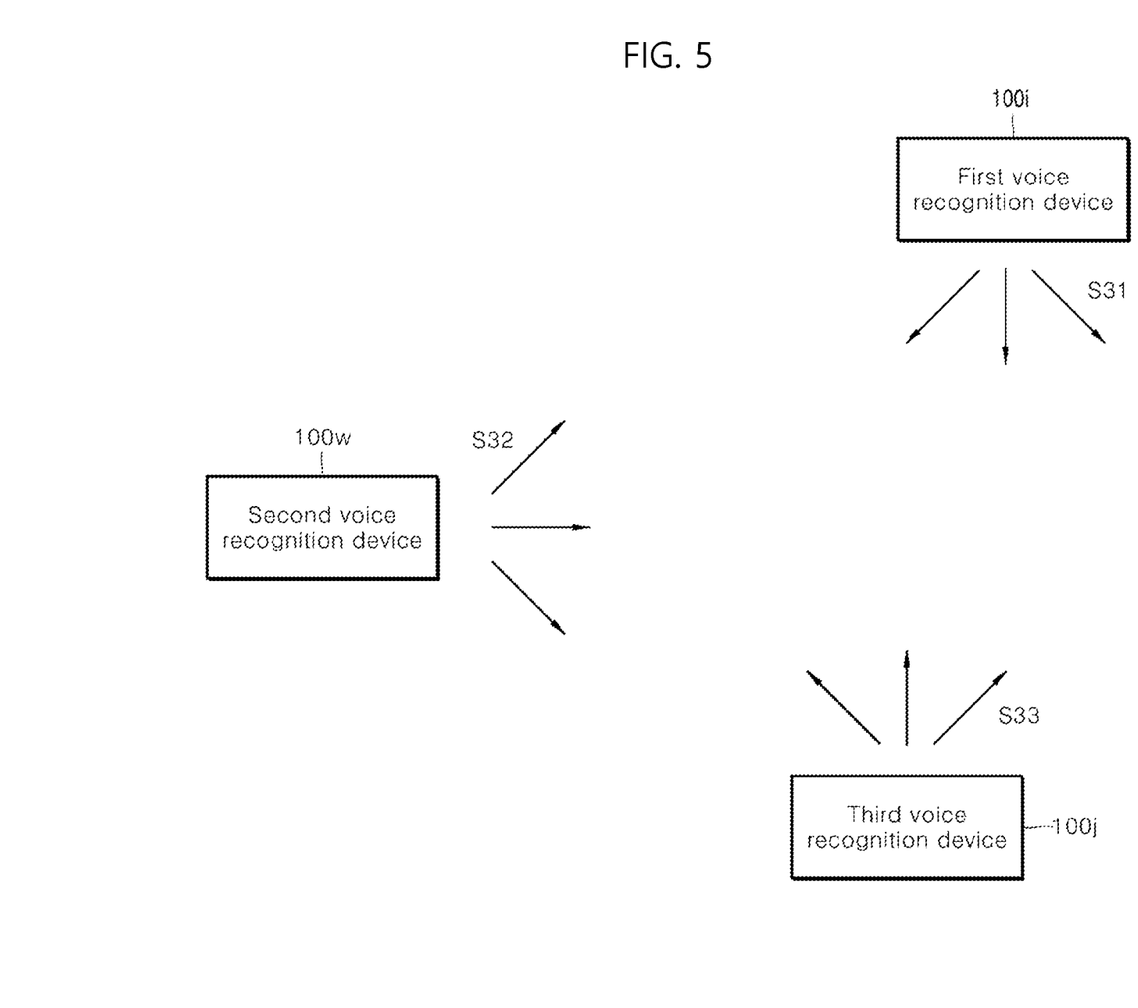
FIG. 5 shows a process in which each of the devices plays an operation sound to share its position in one embodiment.

FIG. 5 shows a process in which each of the devices plays an operation sound to share its position in one embodiment.

The first voice recognition device 100*i*, the second voice recognition device 100*w* and the third voice recognition device 100*j* may respectively output an operation sound while broadcasting identification information of the devices (S31 & S32 & S33). Each of the devices may store the identification information of the other devices and a direction or distance information of the other devices in relation to the input operation sounds.

For example, when the voice input unit 110 installed in the second voice recognition device 100*w* is a directional microphone, it may be found that the first voice recognition device 100*i* is disposed in a leftward direction. Alternatively, when the voice input unit 110 is dispose on both sides, i.e., left and right sides, of the second voice recognition device 100*w*, the voice input unit 110 on both sides may ascertain a direction, using a difference in the loudness of an input sound, and the second voice recognition device 100w my ascertain a position of the first voice recognition device 100i.

Additionally, a distance based on a loudness of an operation sound input may be calculated. During the above process of broadcasting identification information, the first voice recognition device 100i may also inform the other devices of the loudness of the operation sound.

Accordingly, when an operation sound is output, the controller 150 of each of the devices may compare an original loudness of the operation sound output by the other devices with an operation sound input to the voice input unit 110. The controller 250 may calculate a distance of other devices having output the operation sound, using results of the comparison. The distance is inversely proportional to the loudness of the sound.

In the embodiments described above, each of the devices may store information on positions or distances and the like of the other devices. For example, each of the devices may ascertain positions or distances of the other devices, using a map generated by the robot cleaner 100e or an operation sound.

Thus, when receiving a voice instruction from the user, the first voice recognition device 100i may deliver the voice instruction to the second voice recognition device 100w that is to operate and instructs to operate. The second voice recognition device 100w may perform a function by applying information indicating that the user who input the voice instruction is around the first voice recognition device 100i. In particular, when the air purifier 100b and the air conditioner 100d, or a plurality of televisions disposed in different rooms or the living room operate, the user's position information may be an important factor.

In the embodiment according to the present disclosure, even when the voice input unit 110 is a single mic array, the user's direction may be ascertained using the map generated by the robot cleaner 100e, and the voice recognition devices may ascertain a position accurately, based on the map.

In particular, during processes of controlling the robot cleaner 100e and controlling a voice instruction, or a process of starting cleaning or controlling a specific area learned by the robot cleaner, a position of a home appliance may be ascertained. When the user inputs a specific point using a voice, the robot cleaner 100e may store information of the point as a point input by the user using the voice.

In the above embodiments, the voice recognition device may guess a position of a speaker, using voice input units 110, e.g., microphones, of various types of devices providing a voice service. Additionally, the voice recognition device may ascertain a user's position information by combining position information of each home appliance and a speaker's position, and based on the user's position, performed a function, thereby ensuring improvement in the ease of use and the performance of devices and automatic control over the devices.

Additionally, the voice input unit 110, e.g., a mic array included in the voice recognition devices disposed in different positions may allow the voice recognition device to obtain position information of the user. When the voice input unit 110 disposed in the voice recognition device is a directional mic, direction information of a voice input to each voice recognition device may be included in a control message.

Then the voice recognition device having received the control message may collect the direction information to generate the user's position information.

Further, each device may output an operation sound (notification sound) of a product at a predetermined time point, and the other devices having received the operation sound may calculate a position of the corresponding device.

Certainly, the robot cleaner, as illustrated in FIGS. 2 and 3, may share map information, learned and generated by the robot cleaner during a travel, with the devices such that each device generates its position information and other device's position information.

In the above embodiments, in particular, when the air conditioner or the air purifier, and the robot cleaner need position information to perform a function, the devices may operate with directionality.

Furthermore, the voice recognition device may automatically adjust a volume of a voice of feedback based on a distance from the user or the user's position.

Figure 6:
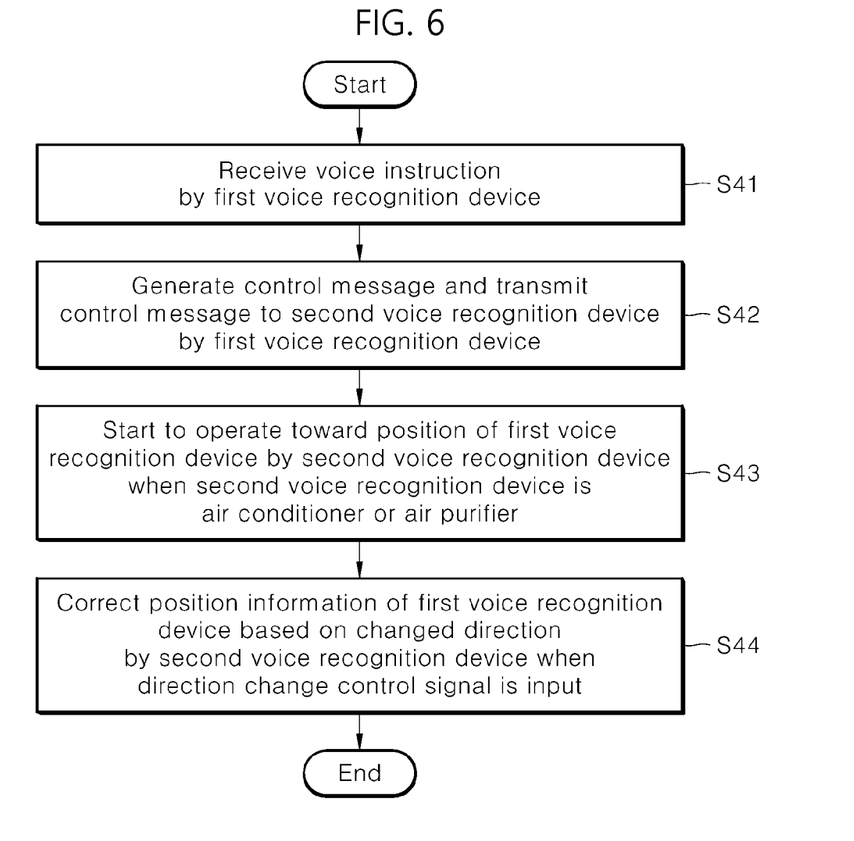
FIG. 6 shows a process in which an air conditioner or an air purifier operates in one embodiment.

FIG. 6 shows a process in which an air conditioner or an air purifier operates in one embodiment.

A first voice recognition device 100i may receive a voice instruction (S41). The first voice recognition device 100i may generate a control message through the above processes and transmit the control message to a second voice recognition device 100w (S42).

When the second voice recognition device 100w is an air purifier or an air conditioner, a controller 150 of the second voice recognition device 100w may determine that a user is around the first voice recognition device 100i, and start operation toward a position of the first voice recognition device 100i (S43). Accordingly, the controller 150 of the second voice recognition device 100w may control a function provider 130 such that the function provider provides a function indicated by the control message. The controller 150 of the second voice recognition device 100w may adjust a direction, intensity and the like of air.

Then when an interface 190 of the second voice recognition device 100w receives a direction change control signal within a predetermined period (e.g., three seconds to ten seconds), it is determined that the user changes the direction of air. Then the controller 150 of the second voice recognition device 100w may correct position information of the first voice recognition device 100i based on the changed direction (S44). Even when the direction of the air conditioner/the air purifier is re-adjusted after the user speaks, the controller 150 may correct position information of the first voice recognition device 100i based on the changed direction.

Figure 7:
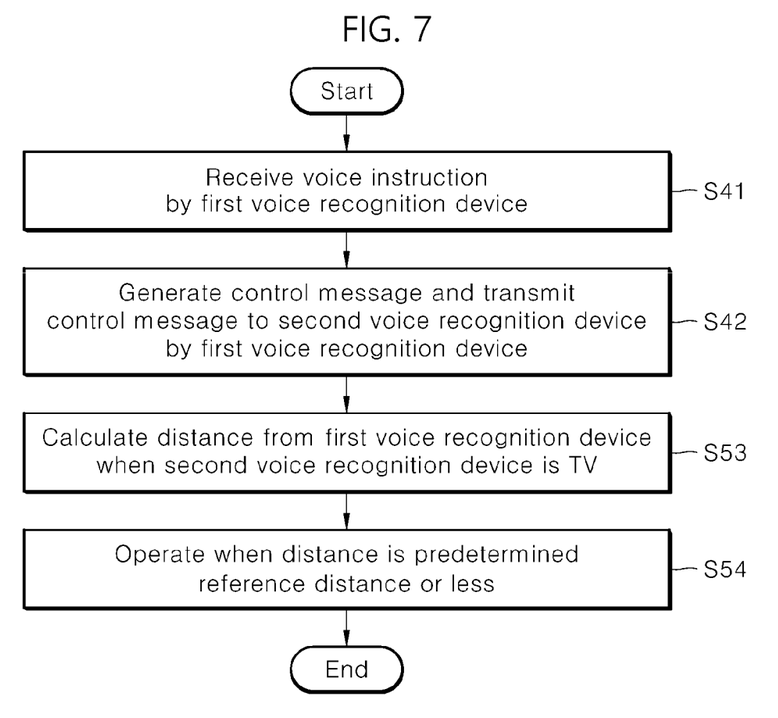
FIG. 7 shows a process in which a television operates in one embodiment.

FIG. 7 shows a process in which a television operates in one embodiment. Steps 41 and 42 are the same as those described with reference to FIG. 6.

When a television is the second voice recognition device 100w, the controller 150 of the second voice recognition device 100w may calculate a distance from the first voice recognition device 100i (S53). When the distance between the two devices is a predetermined reference distance or less, the second voice recognition device 100w may perform a function (S54).

For example, suppose that the user says "Turn on the TV" in front of the refrigerator as illustrated in FIG. 2. The television is disposed in bedroom 4 and the living room, and all the televisions in the living room and bedroom 4 have received a control message.

In this case, the television in the living room may calculate a distance from the refrigerator (the first voice recognition device), using the received control message or previously-received position information. When it is determined that the distance is within a predetermined distance, the television in the living room may be turned on according to the instruction included in the control message.

The television in bedroom 4 may calculate a distance from the refrigerator (the first voice recognition device), using the received control message or previously-received position information. When it is determined that the distance is greater than the predetermined distance, the television in bedroom 4 may not comply with the instruction included in the control message.

As a result, the television near the user may only be turned according to the user's request.

Then when the interface 190 of the second voice recognition device 100w receives a direction change control signal within a predetermined period (e.g., three seconds to ten seconds), it is determined that the user changes a direction of air. Then the controller 150 of the second voice recognition device 100w may correct position information of the first voice recognition device 100i based on the changed direction (S44). Even when the direction of the air conditioner/the air purifier is re-adjusted after the user speaks, the controller 150 may correct position information of the first voice recognition device 100i based on the changed direction.

Even though all the components of the embodiments in the present disclosure are described as being combined into one component or operating in combination, embodiments are not limited to the embodiments set forth herein, and all the components can be selectively combined to operate within the scope of the purpose of the disclosure. All the components can be respectively implemented as an independent hardware, or some or all of the components can be selectively combined and can be embodied as a computer program including a program module that performs some or all functions combined into one or more hardwares. Codes or code segments of the computer program can be easily inferred by those skilled in the art. The computer program can be stored in a computer-readable recording medium and can be read and executed by a computer, whereby the embodiments in the disclosure can be realized. Examples of a storage medium of the computer program include storage mediums including a magnetic recording medium, an optical recording medium and a semiconductor recording element. The computer program for realizing the embodiments in the disclosure includes a program module which is transmitted via an external device in real time.

The embodiments are described above with reference to a number of illustrative embodiments thereof. However, numerous other modifications and embodiments can be devised by one skilled in the art without departing from the technical spirit of the disclosure. Thus, it is to be understood that all the modifications and changes are included in the scope of the technical spirit of the disclosure.

The invention claimed is:

1. A voice recognition device, wherein the voice recognition device is a first voice recognition device, comprising:
   a voice input unit configured to receive a voice instruction;
   a function provider configured to provide a predetermined function;
   a first controller configured to (i) analyze the voice instruction received at the voice input unit, (ii) identify a second voice recognition device that is configured to execute the voice instruction, and (iii) generate a control message to be transmitted to the second voice recognition device; and
   a communicator configured to transmit the control message to the second voice recognition device or to a plurality of devices that include the second voice recognition device;
   wherein the first controller is configured to (i) generate the control message that includes position information of the first voice recognition device, based on map information received from a robot cleaner, and (ii) based on position information of the second voice recognition device, generate relative position information of the first voice recognition device, wherein the control message comprises the relative position information,
   wherein the second voice recognition device is an air purifier or an air conditioner,
   wherein the second voice recognition device is configured to (i) determine that a user is around the first voice recognition and, (ii) set the first voice recognition device as the user's position and perform the predetermined function based on the user's position, and
   wherein the second voice recognition device includes:
      an interface configured to receive a direction change control signal, and
      a second controller configured to, based on (i) the interface receiving the direction change control signal within a predetermined period and (ii) a direction of the air purifier or the air conditioner being changed after the user speaks, correct the position information of the first voice recognition device by changing the relative position information of the first voice recognition device based on the direction change control signal.

2. The voice recognition device of claim 1, wherein the control message comprises a voice file generated by the first voice recognition device, wherein the voice file corresponds to the voice instruction received at the voice input unit.

3. The voice recognition device of claim 1, further comprising:
   an instruction database configured to store instructions corresponding to functions of a plurality of voice recognition devices,
   wherein the first controller is configured to (i) extract identification information and control information of the second voice recognition device from the voice instruction using the instruction database, and (ii) generate the control message.

4. A voice recognition device, wherein the voice recognition device is a second voice recognition device, comprising:
   a voice input unit configured to receive a voice instruction;
   a function provider configured to provide a predetermined function;
   a communicator configured to receive a control message from a first voice recognition device; and
   a controller configured to control the function provider according to the control message,
   wherein the second voice recognition device is an air purifier or an air conditioner,
   wherein the controller is configured to (i) extract position information of the first voice recognition device from the control message, based on map information received from a robot cleaner, and (ii) based on position information of the second voice recognition device, extract relative position information of the first voice recognition device from the control message,
   wherein the second voice recognition device is configured to (i) determine that a user is around the first voice recognition and, (ii) set the first voice recognition device as the user's position and perform the predetermined function based on the user's position, wherein the second voice recognition device includes an interface configured to receive a direction change control signal, and wherein the controller of the second voice recognition device is configured to, based on (i) the interface receiving the direction change control signal within a predetermined period and (ii) a direction of the air purifier or the air conditioner being changed after the user speaks, correct the position information of the first voice recognition device by changing the relative position information of the first voice recognition device based on the direction change control signal.

5. The voice recognition device of claim 4, wherein the communicator is configured to receive position information of the first voice recognition device or map information that includes the position information from a cloud server or an external device.

6. The voice recognition device of claim 4, wherein the control message comprises a voice file generated by the first voice recognition device, wherein the voice file corresponds to another voice instruction received at another voice input unit of the first voice recognition device.

7. The voice recognition device of claim 4, wherein the controller is configured to control the function provider to provide the predetermined function indicated by the control message.

8. A method for controlling a device, the method comprising:

using voice recognition in (i) a first voice recognition device and a second voice recognition device that are configured to receive a voice instruction, and (ii) a third voice recognition device that is configured to provide a predetermined function corresponding to the voice instruction;

transmitting a first control message corresponding to the voice instruction received by a first voice input unit of the first voice recognition device by the first voice recognition device;

transmitting a second control message corresponding to the voice instruction received by a second voice input unit of the second voice recognition device by the second voice recognition device;

receiving the first control message and the second control message by a communicator of the third voice recognition device; and providing the predetermined functions indicated by the first control message and the second control message based on position information of the first voice recognition device and the second voice recognition device by a controller of the third voice recognition device, wherein the controller of the third voice recognition device is configured to (i) extract the position information of the first voice recognition device from the first control message and extract the position information of the second voice recognition device from the second control message, based on map information received from a robot cleaner, and (ii) based on position information of the first voice recognition device determined by a loudness of a sound input to the first voice recognition device and a loudness of a sound input to the second voice recognition device, extract relative position information of the first voice recognition device from the first control message, wherein the controller of the third voice recognition device is configured to (i) determine that a user is around the first voice recognition and, (ii) set the first voice recognition device as the user's position and perform the predetermined function based on the user's position, wherein the third voice recognition device is an air purifier or an air conditioner, wherein the third voice recognition device includes an interface configured to receive a direction change control signal, and wherein the controller of the third voice recognition device is configured to, based on (i) the interface receiving the direction change control signal within a predetermined period and (ii) a direction of the air purifier or the air conditioner being changed after the user speaks, correct the position information of the first voice recognition device by changing the relative position information of the first voice recognition device based on the direction change control signal.

9. The method of claim 8, wherein the communicator of the third voice recognition device is configured to receive the position information of the first voice recognition device and the second voice recognition device or map information that includes the position information from a cloud server or an external device.

10. The method of claim 8, further comprising:

outputting a first operation sound by a first interface of the first voice recognition device;

outputting a second operation sound by a second interface of the second voice recognition device; and calculating a distance between the first voice recognition device and the second voice recognition device by the controller of the third voice recognition device based on a volume of the first operation sound.

* * * * *